United States

Gloge

4,000,936

Jan. 4, 1977

[54] OPTICAL FIBER JACKET DESIGNS FOR MINIMUM DISTORTION LOSS

[75] Inventor: Detlef Christoph Gloge, Red Bank, N.J.

[73] Assignee: Bell Telephone Laboratories, Incorporated, Murray Hill, N.J.

[22] Filed: July 30, 1974

[21] Appl. No.: 493,029

[52] U.S. Cl. .................. 350/96 WG; 350/96 B
[51] Int. Cl.² ............................ G02B 5/16
[58] Field of Search .......... 350/96 WG, 96 R, 96 B

[56] References Cited

UNITED STATES PATENTS

| | | | |
|---|---|---|---|
| 3,434,774 | 3/1969 | Miller | 350/96 WG |
| 3,535,017 | 10/1970 | Miller | 350/96 WG |
| 3,625,589 | 12/1971 | Snitzer | 350/96 WG |
| 3,703,690 | 11/1972 | Ravenscroft et al. | 350/96 WG X |
| 3,737,293 | 6/1973 | Maurer | 350/96 WG X |
| 3,740,116 | 6/1973 | Andrews, Jr. | 350/96. B |
| 3,865,466 | 2/1975 | Slaughter | 350/96 WG X |
| 3,887,265 | 6/1975 | Margolis et al. | 350/96 B |

*Primary Examiner*—Edward S. Bauer
*Assistant Examiner*—Steward Levy
*Attorney, Agent, or Firm*—Thomas C. O'Konski; James F. Hollander

[57] ABSTRACT

Substantial reductions in the distortion loss in an optical fiber waveguide due to the influence of random external forces can be realized by encasing the fiber in a properly designed jacket. In accordance with the disclosed invention, the ability of a jacketed optical fiber structure to resist external forces is characterized by a parameter referred to as its retention length R, given by $$R = 2\pi \left(\frac{H}{D_f}\right)^{1/4}.$$

where H is the flexural rigidity of the jacketed fiber and $D_f$ is the lateral rigidity of the jacketed fiber. It is shown that minimum distortion loss can be achieved by designing the fiber jacket so that the retention length R of the combined fiber-jacket structure exceeds a critical coupling wavelength $\Lambda_c$ for the fiber. A variety of illustrative jacket designs are described.

9 Claims, 12 Drawing Figures

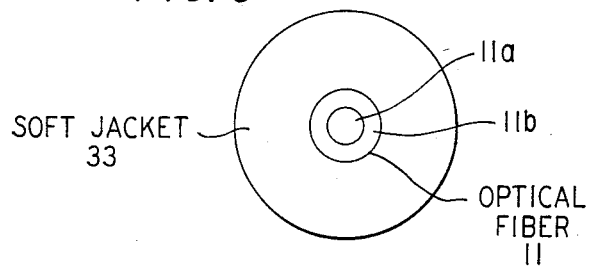
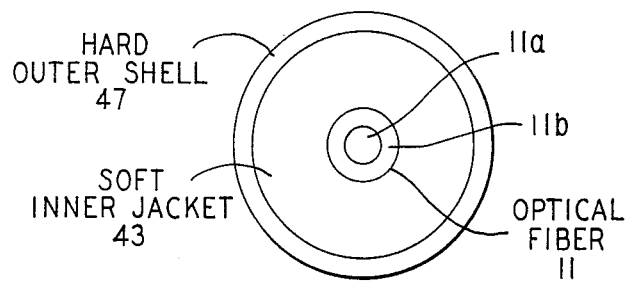
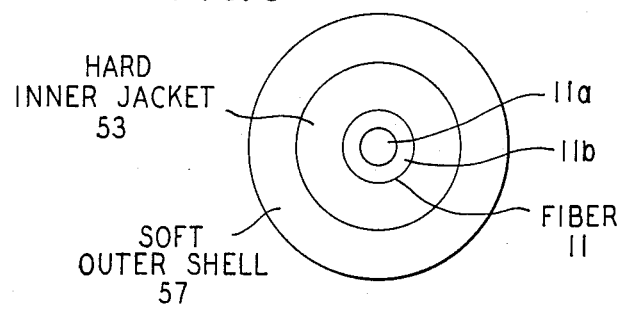
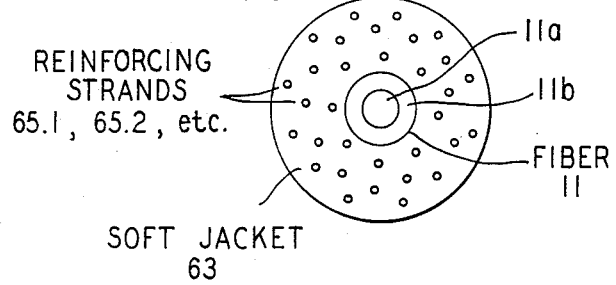

OPTICAL FIBER JACKET DESIGNS FOR MINIMUM DISTORTION LOSS

BACKGROUND OF THE INVENTION

This invention relates to the design of protective jackets for optical fiber transmission media.

Research and development work in the field of optical fiber transmission is advancing rapidly toward the first commercial use of optical fibers in communication systems. A variety of fiber waveguiding structures have been reported which are capable of transmitting large quantities of information via modulated optical wave energy in a single mode or multimodes with transmission losses as low as 2 decibels per kilometer. It is expected that such fibers will eventually be used much as wire pairs, coaxial cable and metal waveguides are now used in conventional lower frequency systems. Although a variety of fiber arrangements are presently being studied, it is likely that the earliest implementation will involve the use of a fiber cable which includes a plurality of optical fibers. Forming the individual fibers in closely packed, well-defined relative positions in a single cable enclosure will permit multiple channel transmission and, at the same time, will facilitate handling (e.g., splicing) of the fibers in the field.

For an excellent review of the state of the art of optical fiber transmission, reference is made to the article in Volume 61 of the *Proceedings of the IEEE*, pages 1703–1751 (December 1973).

Because of their relatively small size (i.e., overall fiber diameters typically range anywhere from about a few micrometers to 150 micrometers), optical fibers are inherently fragile structures. In most presently known fibers, surprisingly small external forces cause substantial distortions of the fiber's central axis. As shown in the paper by D. Marcuse in Volume 51 of the *Bell System Technical Journal*, pages 1199–1232 (1972), such distortions can cause coupling of the optical wave energy propagating in a fiber from one mode to another mode, with consequent optical energy loss. For example, it can be shown that minute irregularities in the machined surface of a metal drum on which a fiber is wound suffice to cause substantial distortion loss therein, even if the fiber is wound on the drum with only a few grams of tension. The forces exerted on the individual fiber in a cable enclosure will almost certainly be considerably stronger and less uniform than these drum forces. The concern with this problem has increased recently with the realization that the lowest loss values for any particular fiber are measured almost invariably in connection with an extremely small amount of mode coupling, and after carefully eliminating external forces from the fiber.

The broad object of the present invention is to provide a variety of arrangements for effectively shielding an optical fiber from the influence of external forces, and thus for minimizing distortion loss.

SUMMARY OF THE INVENTION

The present invention is based upon the realization that substantial reductions in the distortion loss in optical fibers due to random external forces can be achieved by encasing each fiber in a properly designed protective jacket. In accordance with the present invention, the ability of a jacketed optical fiber structure to resist external forces is characterized by a parameter referred to as its retention length R, given by $$R = 2\pi \left(\frac{H}{D_f}\right)^{1/4}$$

where H is the flexural rigidity of the jacketed fiber and $D_f$ is the lateral rigidity of the jacketed fiber. It is shown that minimum distortion loss can be achieved by designing the fiber jacket so that the retention length R of the combined fiber-jacket structure exceeds a critical coupling wavelength $\Lambda_c$ for the fiber. Generally, the desired retention length R is achieved by fabricating the jacket to have substantial lateral compliance (i.e., low lateral rigidity $D_f$), and substantial longitudinal stiffness or rigidity (i.e., large flexural rigidity H). The jacket design appropriate for any particular fiber involves the proper selection of the jacket configuration, materials and thicknesses according to the basic theory of the invention set forth in detail hereinbelow.

A variety of illustrative jacket embodiments are disclosed which have been designed according to the invention to minimize distortion loss in an illustrative multimode core-cladding optical fiber structure. It is shown, for example, that adequate retention lengths can be achieved by employing a simple single layer jacket, provided that the jacket material is sufficiently soft, and that the jacket thickness is sufficiently large. Two-layered jacket configurations are also disclosed in which the desired retention lengths are achieved by combining a relatively hard encasing layer and a relatively soft encasing layer in the jacket. Finally, an embodiment is disclosed in which the desired retention lengths are achieved by employing a single layered jacket which is reinforced with longitudinally oriented strands of relatively hard material, such as graphite. The reductions in distortion loss with each of these embodiments are calculated to be approximately of three-to-four orders of magnitude.

BRIEF DESCRIPTION OF THE DRAWING

These and other features and advantages of the invention will be better understood from the following detailed description taken in conjunction with the accompanying drawing in which:

FIGS. 3 through 6 are cross-sectional views of various alternative jacket embodiments of the invention;

DETAILED DESCRIPTION

1. Theory

Figure 1A:
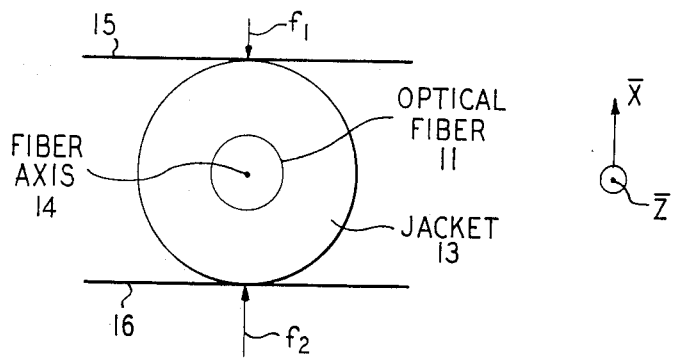
FIGS. 1A through 1C are cross-sectional views of a jacketed optical fiber structure useful in the explanation of the theory of the invention.
Figure 1B:
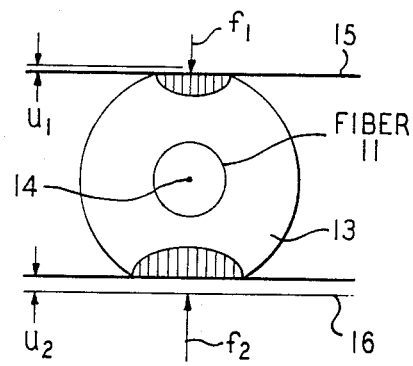
Figure 1C:
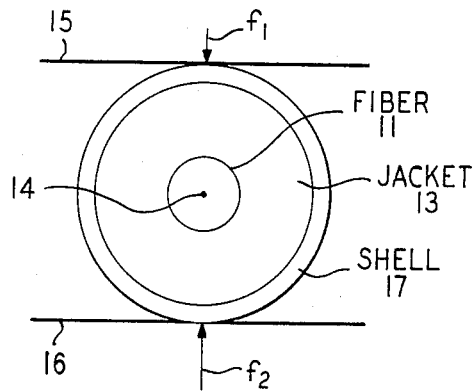

Before proceeding with a detailed description of the various embodiments of the invention, it is useful, for the purpose of obtaining a full understanding thereof, to analyze theoretically the elastic deformations involved in a jacketed optical fiber waveguide subjected to lateral forces. Reference is thus first made to FIGS. 1A through 1C of the drawing. The various parts that are numbered with like reference numerals in FIGS. 1A through 1C are intended to be identical. It should be noted that none of the figures of the drawing is necessarily drawn to exact scale or to relative dimensions.

There is shown in FIG. 1A a cross section of an optical fiber waveguide 11 encased in a protective outer jacket 13, which jacket illustratively is disposed in contact with the fiber and extends along its entire length. Fiber 11 may be any of the presently known fiber waveguides, such as the classical core-cladding type fiber comprising an inner core of an optically transparent material surrounded by an outer cladding of an optically transparent material of slightly lower refractive index than that of the core. It may be of the graded-index type, in which the refractive index of the fiber is a maximum along the fiber's central axis 14 and gradually decreases in value radially away from the axis. Fiber 11 may also be of the single mode or of the multimode type. In each case, the useful optical wave energy tends to be confined within the inner region of fiber 11 and propagates in or out of the plane of the figure along the fiber's central axis 14, which corresponds to the z axis of the illustrated frame of reference.

As illustrated in FIG. 1A, it is assumed that the structure of fiber 11 and jacket 13 is pressed between two infinitely rigid, slightly rough, but otherwise flat, contacting surfaces 15 and 16. As a result of the roughness in surfaces 15 and 16, the forces exerted by the surfaces, $f_1(z)$ and $f_2(z)$, respectively, are non-uniform and typically unequal at any particular point z along the z axis (e.g., $f_2$ is illustratively larger than $f_1$). Fiber axis 14 accordingly tends to bend yielding to the difference $f(z) = f_1(z) - f_2(z)$.

According to the theory of a thin elastic beam, the lateral displacement $x(z)$ of fiber axis 14 is related to $f(z)$ by $$\frac{d^4x(z)}{dz^4} = \frac{f(z)}{H} \quad (1)$$

where H is referred to as the flexural rigidity of the structure and is given by $$H = \sum_m E_m I_m \quad (2)$$

where the sum in Equation (2) is over all of the elements of the flexed structure (i.e., $m = 1$ for fiber 11 and $m = 2$ for jacket 13), $E_m$ is Young's modulus for the $m^{th}$ element of the structure, and $I_m$ is the moment of inertia of the $m^{th}$ element. For the case of concentric cylinders, $$I_m = \frac{\pi}{4}(a_m^4 - a_{m-1}^4) \quad (3)$$

where $a_m$ is the outer diameter and $a_{m-1}$ is the inner diameter of the $m^{th}$ cylinder. For the solid central cylinder in the structure (i.e., fiber 11) $a_0 = 0$.

As illustrated in FIG. 1B, forces $f_1(z)$ $f_2(z)$ not only cause longitudinal bending, but also a compression and corresponding deformations $u_1(z)$ and $u_2(z)$, respectively, of the fiber-jacket structure. If forces $f_1(z)$ and $f_2(z)$ are such that they do not change too drastically along z, deformations $u_1(z)$ and $u_2(z)$ are a linear function of the forces applied. It is thus assumed that forces $f_1(z)$ and $f_2(z)$ vary sufficiently gradually with z so that the difference $u(z) = u_1(z) - u_2(z)$ is proportional to $f(z)$, the difference in the forces. A proportionality factor D may thus be introduced, which is given by $$u(z) = \frac{f(z)}{D} \quad (4)$$

where the factor D is referred to as the lateral rigidity of the fiber-jacket structure. For the case of a relatively thick, relatively soft jacket, such as that illustrated in FIG. 1B, the lateral rigidity D can be closely approximated by Young's modulus $E_2$ of the jacket material. For the case of a relatively hard hollow cylindrical shell, such as shell 17 illustrated in FIG. 1C, the lateral rigidity $D_3$ thereof is given by $$D_3 = E_3 \frac{4(a_3-a_2)^3}{a_3(a_3+a_2)^2} \quad (5)$$

where $E_3$ is Young's modulus of the shell material, $a_3$ is the outer diameter and $a_2$ is the inner diameter of the shell. If the shell surrounds an inner jacket of a relatively soft material, such as jacket 13 of FIG. 1C, the lateral rigidities approximately add so that $$D = D_3 + E_2 \quad (6)$$

The irregularities in the contacting surfaces 15 and 16 which give rise to forces $f_1(z)$ and $f_2(z)$ are designated $v_1(z)$ and $v_2(z)$, respectively. It is assumed that jacket 13 (or shell 17) is compressible enough to conform to the irregularities $v_1(z)$ and $v_2(z)$ everywhere, so that regions of continuous contact exist at each contacting surface. This imposes the relationship $$v(z) - u(z) = 2x(z) \quad (7)$$

where $v(z) = v_1(z) - v_2(z)$. Equations (1), (4) and (7) can now be combined to yield the differential equation $$\frac{H}{D} \frac{d^4x(z)}{dz^4} + 2x(z) = v(z) . \quad (8)$$

Equation (8) applies to the general case of a jacketed fiber pressed between two infinitely rigid, slightly rough, contacting surfaces 15 and 16. It can be modified to apply to two special cases of interest. If, for example, surface 16 is a slightly rough drum surface on which the jacketed fiber is wound, Equation (8) is still valid if the factor "2" on the left-hand side of the equation is replaced by unity. In such a case, the drum surface is likely to have a lateral rigidity $D_d$ which is finite and which is different in value than the lateral rigidity $D_f$ of the jacketed fiber. This fact can be accounted for in Equation (8) by selecting D according to the relation $$D = \frac{1}{1/D_d + 1/D_f} \quad (9)$$

where $D_d$ may be approximated by Young's modulus of the drum material, and $D_f$ is either Young's modulus of the jacket material or is calculated according to Equations (5) and (6) above.

The second special case of interest involves pressing the jacketed fiber between two adjacent jacketed fibers of the same kind. In such a case, the lateral rigidity $D_f$ of the jacketed fiber shown in the figures is equal to the lateral rigidity of each of the contacting surfaces 15 and 16. This case can be accounted for in Equation (8) by selecting D according to the relation $$D = \frac{D_f}{2}. \quad (10)$$

It should be noted that the quantity $v(z)$ in Equation (8) for the latter case results from the combined irregularities of the outer surfaces of the adjacent jacketed fibers at each region of contact. It should also be noted that Equation (8) is valid for each of the above-described cases only when the adjacent surfaces make continuous contact so that the deformations are proportional to the forces involved.

Fourier transforms X(K) and V(K) are now introduced for the quantities $x(z)$ and $v(z)$. These transforms are functions of wave number K, or spatial wavelength $\Lambda$ related to K by $$K = 2\pi/\Lambda. \quad (11)$$

The operation d/dz in Equation (8) is transformed simply into a multiplication by K, and the equation can now be written in the form $$X = \frac{V}{2+(2\pi)^4 H/D\Lambda^4}. \quad (12)$$

Figure 2:
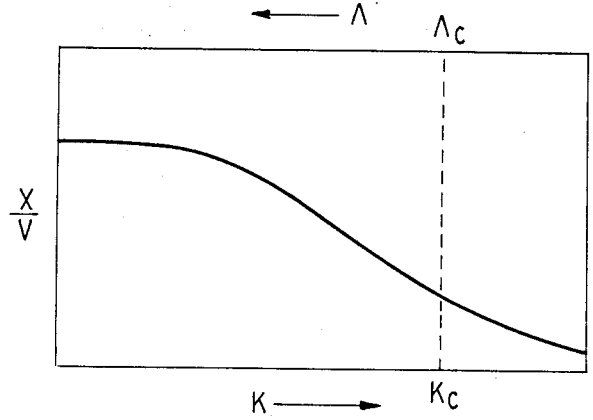
FIG. 2 is a plot illustrative of the effects of external disturbances of spatial wavelength Λ or wave number K, on the fiber axis displacement.

The ratio of the Fourier components, X/V, is sketched in FIG. 2 of the drawing as a function of wave number K and spatial wavelength $\Lambda$. It is clear from FIG. 2 that the effect each Fourier component V has on the fiber axis displacement X depends strongly on the spatial wavelength of that component. Specifically, relatively short wavelength disturbances have less of an effect on the fiber axis than relatively long wavelength disturbances. As shown in the paper by D. Marcuse in Volume 51 of the Bell System Technical Journal, pages 1199–1232 (1972), there is a particular set of oscillatory components which must be kept from affecting the fiber axis if random mode coupling is to be effectively reduced. For an optical fiber of the classical core-cladding type, for example, this set is concentrated in the vicinity of, and particularly aobve, the critical spatial wavelength given by $$\Lambda_c = 2\pi a_c/(2\Delta)^{\frac{1}{2}} = 2\pi/K_c \quad (13)$$

where $a_c$ is the radius of the fiber core and $\Delta$ is the relative refractive index difference between the core and cladding (i.e., $n_2 = n_1 (1-\Delta)$, where $n_1$ is the index of the core and $n_2$ is the index of the cladding). For a fiber of the graded index type, Equation (13) is still valid if $a_c$ is the core radius of the fiber and the index of refraction in the core of the fiber is given by $$n = n_1[1-\Delta(r/a_c)^\alpha] \quad (14)$$

where $n_1$ is the index of refraction along the fiber's central axis, r is the radial distance away from the axis (i.e., $r \leq a_c$) and $\alpha$ is a number greater than one (e.g., $\alpha = 2$ for a parabolic index core). In a typical multimode fiber, $a_c = 25$ micrometers ($\mu m$) and $\Delta = 0.02$, so that $\Lambda_c$ is approximately equal to 1 millimeter (mm).

Consider now, as an example, the special case of interest in which a jacketed fiber is pressed between two adjacent jacketed fibers of the same kind. As noted above in Equation (10), this case requires that D in Equation (12) be replaced by $D_f/2$. The quantity R is introduced which is given by

$$R = 2\pi(H/D_f)^{\frac{1}{4}}. \quad (15)$$

The above-cited paper of Marcuse shows that the amount of random mode coupling, and consequently the amount of distortion loss associated therewith, is proportional to the quantity $<X>^2$ which is the average of the square of the Fourier component X corresponding to the fiber axis displacement. For this special case of interest, Equation (12) can be rewritten as $$\frac{<X>^2}{<V>^2} = \frac{1}{4[1+(R/\Lambda)^4]^2} \quad (16)$$

where $<v>^2$ is the average of the square of the Fourier component V. The quantity R, which is referred to as the retention length of the jacketed fiber, is the central design parameter in the present invention. In order to shield the fiber axis effectively from disturbances of the critical spatial wavelength components (i.e., $\Lambda_c$ and above), R must be such that is exceeds the critical coupling wavelength $\Lambda_c$.

The general object in each specific fiber-jacket embodiment described in detail hereinbelow is to provide maximum protection against external forces by maximizing the characteristic retention length R of the jacketed fiber. This object is generally accomplished according to the invention by employing a jacket which has substantial lateral compliance (i.e., low lateral rigidity $D_f$), and substantial longitudinal stiffness or rigidity (i.e., large flexural rigidity H).

2. Illustrative Jacket Designs

FIGS. 3 through 6 of the drawing illustrate various alternative optical fiber jacket embodiments which have been designed according to the foregoing theory to minimize distortion loss. For brevity and clarity, the description is restricted to one illustrative structure for optical fiber 11. It should be noted that, while the detailed information set forth hereinbelow is based upon this illustrative fiber structure, similar information can readily be derived for other fiber structures in view of the basic theory set forth in Section 1 hereinabove.

Accordingly, fiber 11 of each of FIGS. 3 through 6 is illustratively a multimode optical fiber wavequide comprising core 11a surrounded by cladding 11b which has an index of refraction which is slightly less than that of core 11a. The material of core 11a and cladding 11b is illustratively fused silica. A core-cladding index difference is illustratively obtained in the fiber by adding or exchanging one or more index changing components in the silica. Cladding 11b illustratively has an outer diameter of 80 $\mu m$, while core 11a has an outer diameter of 50 $\mu m$. If the relative core-cladding index difference $\Delta$ is assumed to be 0.02, the critical coupling wavelength $\Lambda_c$, as calculated hereinabove, is about 1 mm. Young's modulus $E_1$ for silica is about $10^7$ pounds per square inch (psi).

FIG. 3 shows a first illustrative embodiment of the invention. Optical fiber 11 of FIG. 3 is encased in a relatively thick single layer jacket 33 which is comprised of a relatively soft material. In general, the material and thickness of jacket 33 are selected according to the invention so that the retention length R of the jacketed fiber structure, as given by Equation (15) above, exceeds the critical coupling wavelength $\Lambda_c$ for the fiber (e.g., 1 mm). This can be achieved in the embodiment of FIG. 3 simply by selecting the modulus $E_2$ of the jacket material to be sufficiently small, and by selecting the outer diameter of the jacket to be sufficiently large.

It is convenient at this point to select a prior art standard of comparison. Consider, therefore, an optical fiber, such as fiber 11 described hereinabove, which is unjacketed and which is pressed against a drum surface or cable wall having a modulus of about 500,000 psi. Using the foregoing theory, one calculates a retention length R for the fiber of about 0.90 mm. which reveals that the fiber possess very little inherent protection against distortion loss.

Figure 7:
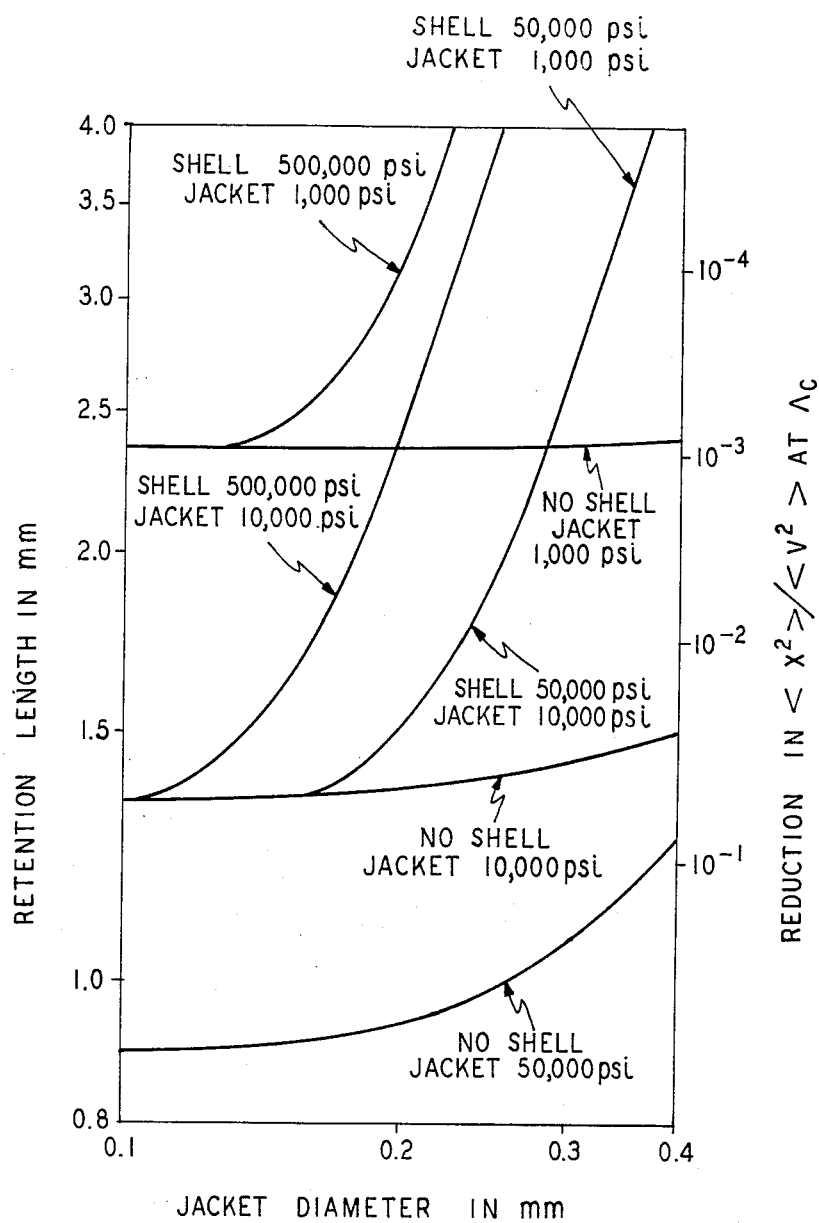
FIG. 7 is a series of plots of retention length R versus jacket diameter for the illustrative embodiments of FIGS. 3 and 4.

In FIG. 7 of the drawing, the curves labeled "no shell" graphically illustrate the variation of retention length R with the outer jacket diameter for a jacket fiber such as illustrated in FIG. 3, for three different jacket moduli (i.e., $E_2 = 50,000$, 10,000 and 1,000 psi, respectively). On the right-hand side of FIG. 7, the corresponding reductions in the quantity $<X>^2/<V>^2$ at $\Lambda_c$ from Equation (16) above are indicated. It is clear from FIG. 7 that the retention length of the jacketed fiber increases as the jacket material is made more soft (i.e., as $E_2$ decreases). For instance, the use of a material for jacket 33 having a modulus of 1,000 psi rather than 50,000 psi results in an increase in retention length R from 0.93 to 2.3 mm at a 200 μm outer diameter.

The increase in R from about 0.90 mm for an unjacketed fiber to 2.3 mm for a jacketed fiber with $E_2 = 1,000$ psi seems modest, but, as shown on the right-hand side of FIG. 7, it results in a reduction of the mode coupling at $\Lambda_c$, and therefore of the distortion loss, by about three orders of magnitude. This rather large coupling reduction is the result of the eighth power of R appearing in Equation (16).

For the illustrative fiber structure 11, it is sufficient if jacket 33 has a modulus $E_2$ less than about 25,000 psi and an outer diameter in excess of about 100 μm (i.e., a jacket thickness in excess of about 20 μm). Jackets with relevant parameters in these ranges provide a retention length R which exceeds 1 mm. It should be noted from FIG. 7 that the protection afforded by the jacket increases (i.e., R increases) as the outer diameter of the jacket is increased. Relatively hard jacket materials can thus be used if the relatively large outer diameter jackets can be tolerated. For most presently proposed fiber applications, however, cost and space considerations limit the outer diameter of the jacket to less than about 400 μm.

The remaining curves in FIG. 7 relate to the illustrative embodiment of the invention shown in FIG. 4 of the drawing. In this embodiment, optical fiber 11 is encased in a relatively thick, relatively soft inner jacket 43 which, in turn, is encased in a relatively thin, relatively hard outer shell 47. Low lateral rigidity $D_f$ is provided in the embodiment by the relatively soft (i.e., low $E_2$) inner jacket 43. High flexural rigidity is provided by the relatively hard (i.e., high $E_3$) outer shell 47. To provide the desired relative rigidities, the modulus of shell 47 should exceed the modulus of jacket 43, and is preferably at least an order of magnitude larger than the modulus of jacket 43. Additionally, jacket 43 is preferably at least about 20 μm in thickness and preferably has a modulus $E_2$ less than about 50,000 psi.

Shell 47, although relatively hard compared to jacket 43, need not be harder than the fiber material (e.g., silica). In fact, even if shell 47 is considerably softer than the fiber material, its large moment of inertia $I_3$, as shown by Equation (3) above to be proportional to the fourth power of its diameter, causes a considerable increase in the flexural rigidity of the embodiment. For example, as shown by FIG. 7, if shell 47 is selected to have a modulus of about 500,000 psi and inner jacket 43 is selected to have a modulus of about 1,000 psi and an outer diameter of 200 μm, the embodiment of FIG. 4 will have a retention length R in excess of 3 mm. As compared to the unjacketed fiber discussed above (i.e., R ~ 0.90 mm), the reduction in coupling and distortion loss with this example would be approximately four orders of magnitude.

Figure 8:
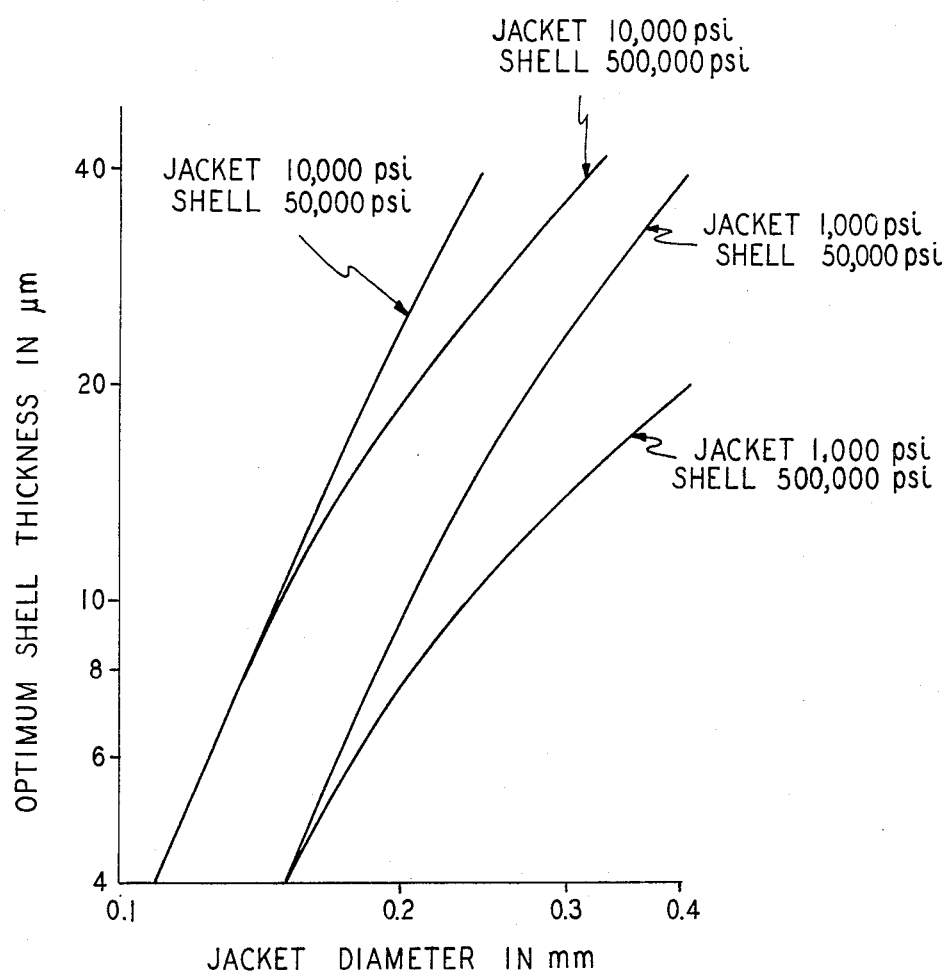
FIG. 8 is a series of plots of the optimum shell thickness versus jacket diameter for the illustrative embodiment of FIG. 4.

There is a limit to the increase in R achievable with the embodiment of FIG. 4, for as shell 47 is made harder and thicker, it begins to spoil the good lateral yielding provided by the soft material of jacket 43. As a result, there is an optimum shell thickness for a given shell material and outer jacket diameter. This optimum shell thickness can be readily calculated for any given set of materials and parameters using the theory of section 1 above. FIG. 8 of the drawing is a series of curves which have been derived for the illustrative fiber structure 11 of FIG. 4, and which indicate the optimum shell thickness as a function of jacket diameter for four specific jacket-shell modulus combinations. As indicated by FIG. 8, shell 47 of 500,000 psi encasing a jacket 43 of 1,000 psi and outer diameter of 200 μm has an optimum shell thickness of about 7.5 μm. Generally, the optimum shell thickness increases as the jacket diameter increases, and as the modulus of shell 47 is made closer in value to the modulus of jacket 43. For the illustrative fiber 11, the optimum shell thickness is typically in the range of about 3 to 50 μm.

It will be noted from FIG. 7 that, with the embodiment shown in FIG. 4, relatively large retention lengths can advantageously be achieved even though the outer diameter of the jacket is relatively small (e.g., less than about 200 μm). The embodiment of FIG. 4 may thus be particularly useful for those applications in which space considerations limit overall diameters to less than about 200 μm.

FIG. 5 of the drawing shows another illustrative embodiment of the invention, which, it will be noted, has a configuration which is complementary to that shown in FIG. 4. Optical fiber 11 of FIG. 5 is encased in a relatively hard inner jacket 53 which, in turn, is encased in a relatively soft outer shell 57. In this embodiment, low lateral rigidity $D_f$ is provided by the relatively soft (i.e., low $E_3$) outer shell 57. High flexural rigidity is provided by the relatively hard (i.e., high $E_2$) inner jacket 53. To provide the desired relative rigidities in this embodiment, the modulus of inner jacket 53 should exceed the modulus of shell 57, and is at least an order of magnitude larger than the modulus of shell 57. Additionally, shell 57 is preferably at least 20 mm thick and preferably has a modulus $E_3$ less than about 50,000 psi. Since the lateral yielding is provided in the outermost layer of the embodiment of FIG. 5 (i.e., soft shell 57), hard inner jacket 53 can be made as thick as desired, if such large overall diameters can be tolerated in the fiber cable. The thicker one makes jacket 53, the larger the R value of the embodiment.

FIG. 6 of the drawing shows still another illustrative embodiment of the invention. The desired distortion loss protection is provided for fiber 11 in this embodiment by a relatively soft single layer jacket 63 reinforced with elongated strands 65.1, 65.2, etc., which are formed of a relatively hard material such as graphite. The reinforcing strands preferably have a modulus which is at least an order of magnitude larger in value than that of jacket 63. They are typically a few micrometers in diameter, and are embedded throughout the jacket material and oriented so that they run essentially along the fiber's central axis. When embedded in this manner, the strands cause a considerable increase in the flexural rigidity of the embodiment by providing a substantial resistance to longitudinal bending. Young's modulus of graphite, for example, is approximately $3.4 \times 10^7$ psi, so that graphite strands significantly resist any bending forces. The lateral rigidity of the jacket material is not significantly affected by the strands, however, since they tend to move rather easily in the lateral direction as the relatively soft jacket is laterally compressed. As with jacket 33 of FIG. 3, the exact modulus selected for jacket 63 of FIG. 6 in any particular application depends for the most part on the outer diameter that can be tolerated. Preferably, the material of jacket 63 has a modulus which is less than about 50,000 psi.

The retention length R of the compound jacket structure of FIG. 6 is difficult to calculate directly. It can, however, be estimated if it is assumed that the percent by volume of the strand material included in jacket 63 contributes proportionately to the total modulus of the jacket. Thus, by way of example, if the material of jacket 63 has a modulus of 10,000 psi and an outer diameter of 300 $\mu$m, and graphite strands are used which occupy approximately 25 percent of the volume of the jacket, the retention length of the embodiment will be about 2.5 – 3.0 mm. The corresponding reductions in coupling and distortion loss over the unjacketed fiber would be 3 to 4 orders of magnitude.

Since the modulus of graphite is more than 3 times larger than that of silica, graphite strands, in addition to providing the desired relative rigidities in the embodiment of FIG. 6, also conveniently provide increased protection against breakage of the fber. Because of the relatively low density of graphite (i.e., about 1.8 grams per cm$^3$), graphite strands are additionally desirable in that they add relatively little weight to the overall fiber structure.

Figure 9:
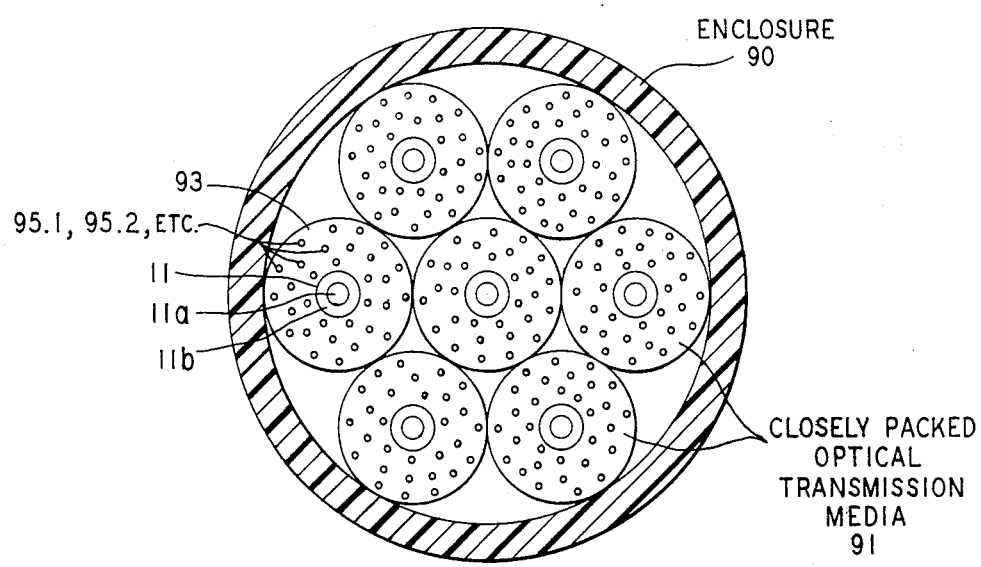
FIGS. 9 and 10 are cross-sectional views of cables utilizing the invention.
Figure 10:
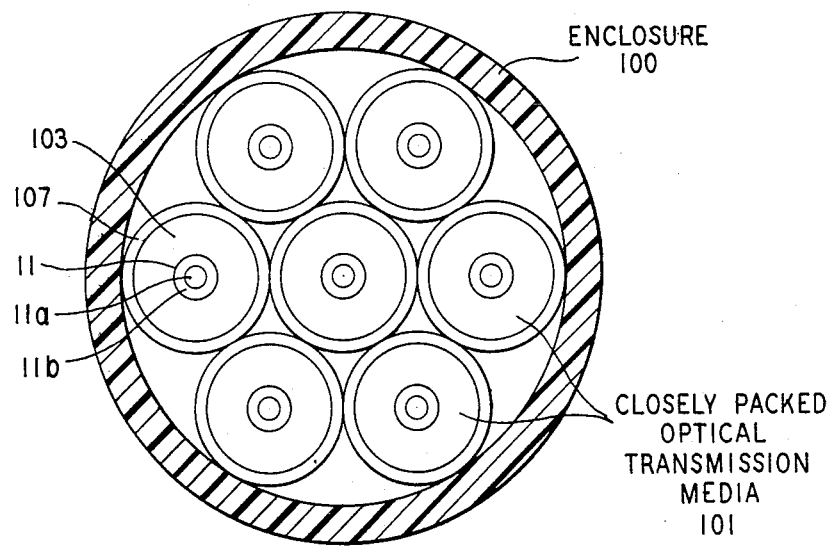

As discussed in the "Background of the Invention", it is contemplated that the fibers are formed in closely packed, well-defined relative positions in a single cable enclosure. FIG. 9, for instance, shows closely packed optical transmission media 91, of the same type as shown in FIG. 6, formed in enclosure 90. Each of the media 91 includes a fiber 11 and has a jacket 93 reinforced with elongated strands 95.1, 95.2, etc., which are formed of a relatively hard material such as graphite. FIG. 10 shows closely packed optical transmission media 101, of the same type as shown in FIG. 4, formed in enclosure 100. Each of the media 101 includes a fiber 11 and has a relatively thick, relatively soft inner jacket 103 which, in turn, in encased in a relatively thin, relatively hard outer shell 107.

3. Materials and Fabrication

These are a wide variety of thermoplastic materials which have moduli spanning the range of about 1,000 psi to $10^5$ psi and higher. Such thermoplastic materials thus provide a convenient group from which to select the materials for the fabrication of the above-described illustrative embodiments. Thermoplastic materials are also particularly useful in that they can be conveniently extruded onto the fiber as, or shortly after, the fiber is drawn, extrusion of the shell and jacket materials appearing at present to be the preferred method of fabrication. In a typical extrusion arrangement, an extrusion nozzle, or head, is employed having a central channel through which the fiber can be passed, and an outer annular channel through which the material to be extruded can be passed. As the fiber is moved continuously through the central channel, the jacket is extruded around it by forcing a charge of the thermoplastic material uniformly through the outer annular channel under pressure. The process is typically facilitated by heating the nozzle and/or the thermoplastic charge. An outer shell of a different thermoplastic material can likewise be extruded over an inner jacket either by using a second nozzle in tandem with the first nozzle, or by using a single nozzle having a first annular channel for the inner jacket and a second, concentric annular channel for the outer shell. Care should be taken in each case to insure that the jackets and shells are extruded onto the fiber with a minimum amount of permanent internal stress. Such stress could itself give rise to distortion loss in the fiber.

Illustrative of the many soft thermoplastic materials useful for the fabrication of the above-illustrated embodiments is DuPont ELVAX 265, which is a copolymer of ethylene and vinyl acetate. The material has a modulus of about 2,000 psi and can be readily extruded onto a fiber to form a jacket of the required dimensions. Such a material would illustratively be suitable for jacket 33 of FIG. 3, inner jacket 43 of FIG. 4, outer shell 57 of FIG. 5, and as the host material of jacket 63 of FIG. 6. Other soft thermoplastic materials useful for these parts of the illustrtive embodiments include DuPont Surlyn (E ~ 1000 psi), which is a copolymer of ethylene and acrylic acid, and 3M Kel F800 (E ~ 1000 psi), which is a copolymer of monochlorotrifluoroethylene and vinylidenefluoride.

Illustrative of the many hard thermoplastic materials useful in the above-described embodiments is polymethylmethacrylate (PMMA). PMMA has a modulus of about 500,000 psi and is likewise easily extruded onto a fiber to form a jacket or shell of the required dimensions. PMMA would illustratively be useful for outer shell 47 of FIG. 4 and for inner jacket 53 of FIG. 5. Other hard thermoplastic materials suitable for the fabrication of these parts of the above embodiments include polycarbonate (E ~ 350,000 psi), nylon (E ~ 450,000 psi), teflon copolymer of tetrafluoroethylene and hexafluoropropylene (FEP), teflon tetrafluoroethylene (TFE) and teflon copolymer of tetrafluoroethylene and perfluorovinyl-methylether (PFE), the latter three of which have an E ~ 50,000 psi.

Reinforcing strands of the type useful in the embodiment of FIG. 6 are generally available from commercial suppliers. For example, suitable graphite strands are offered commercially by Union Carbide as Thornel 300 graphite yarn. These strands have a diameter of approximately 7 $\mu$m. They can be added to the material of the jacket as the jacket is extruded onto the fiber. A variety of commercially available hard thermoplastic or glass reinforcing strands would also be useful in the embodiment of FIG. 6.

Numerous other materials, and perhaps other methods of fabrication, will be found suitable by those skilled in the art for the above-described embodiments. Additionally, it is to be understood that the above-described embodiments are illustrative of but a few of the many possible specific embodiments which can represent applications of the principles of the invention. As noted previously, the broad object of the invention is to provide an optical fiber with maximum protection against external forces by encasing the fiber in a jacket of a type which provides the combined fiber-jacket structure with a characteristic retention length R which is maximized in value. The particular retention length R appropriate for any particular application, and consequently, the particular jacket configuration, materials and thicknesses, are best determined by the skilled worker in each case in view of the basic principles of the invention herein set forth.

I claim:

1. An optical fiber cable comprising a plurality of closely packed optical transmission media, each of said media comprising only one optical fiber waveguide and a protective jacket encasing the fiber and disposed in contact therewith and having an outer diameter less than about 0.4 millimeter and a modulus in the lateral direction which is less than about 50,000 psi, in which said jacket is such that the combined structure of said fiber and said jacket has a characteristic retention length R which exceeds a critical coupling wavelength $\Lambda_c$ for said fiber, where the retention length R is given by $$R = 2\pi \left(\frac{H}{D_f}\right)^{1/4}$$

and where H is the flexural rigidity, and $D_f$ is the lateral rigidity, respectively, of said combined structure, and in which at least one of said optical transmission media further comprises an outer shell encasing said jacket, said shell having a modulus at least an order of magnitude larger than said jacket modulus, said shell having a thickness less than about one tenth of said jacket outer diameter and substantially equal to an optimum value related to said jacket modulus, said jacket outer diameter, and said shell modulus according to the relationship indicated by FIG. 8, whereby mode coupling losses are minimized.

2. The optical fiber cable of claim 1 in which each said fiber is a fiber waveguide comprising an inner core of an optically transparent material having a radius $a_c$ and an index of refraction $n_1$ surrounded by a cladding of an optically transparent material having an index of refraction $n_2$ lower than $n_1$, where $n_2 = n_1(1-\Delta)$, and in which said characteristic retention length R of said combined structure is greater in value than the critical coupling wavelength $\Lambda_c$ given by
$$\Lambda_c = 2\pi a_c/(2\Delta)$$

3. The optical fiber cable of claim 1 in which each said fiber is a fiber waveguide of the graded index type comprising an elongated body of optically transparent material having a core the index of refraction of which is given by
$$n = n_1[1-\Delta(r/a_c)^\alpha]$$
where $n_1$ is the index of refraction along a central axis in said core, r is the radial distance away from said axis in said core, $a_c$ is the radius of said core, and $\alpha$ is a number greater than one, and in which said characteristic retention length R of said combined structure is greater in value than the critical coupling wavelength $\Lambda_c$ given by
$$\Lambda_c = 2\pi a_c/(2\Delta)$$

4. The optical fiber cable of claim 1 in which each said jacket comprises a single layer of material encasing said fiber.

5. The optical fiber cable of claim 4 in which said jacket material has a modulus $E_2$ which is less than about 25,000 psi and an outer diameter $a_2$ which exceeds about 100 micrometers.

6. An optical fiber cable comprising a plurality of optical fiber waveguides in well-defined relative positions, each said fiber having a protective jacket encasing the fiber, said jacket having an outer diameter less than about 0.4 millimeter and a modulus in the lateral direction which is less than about 50,000 psi, said jacket including strands of graphite running throughout the jacket material essentially along the direction of the fiber axis, the combined structure of said fiber and said jacket having a characteristic retention length R which exceeds a critical coupling wavelength $\Lambda_c$ for said fiber.

7. An optical fiber cable comprising a plurality of closely packed optical transmission media, each of said media comprising only one optical fiber waveguide and a protective jacket encasing the fiber and disposed in contact therewith and having an outer diameter less than about 0.4 millimeter, in which said jacket comprises a layer of material encasing said fiber, and in which said material of said layer is embedded with a plurality of elongated strands oriented in said layer to extend essentially along the central axis of said fiber, said strands being formed of a material of modulus which is at least an order of magnitude larger in value than the modulus of the material of said layer, said strands being laterally movable with respect to said fiber due to a substantial lateral compressibility of said material of said layer, the combined structure of said fiber and said jacket having a characteristic retention length R which exceeds a critical coupling wavelength $\Lambda_c$ for said fiber.

8. The optical fiber cable of claim 7 in which said material of said jacket has a modulus $E_2$ which is less than about 50,000 psi.

9. The optical fiber cable of claim 7 in which said strands are formed of graphite.

* * * * *

UNITED STATES PATENT AND TRADEMARK OFFICE
CERTIFICATE OF CORRECTION

PATENT NO. : 4,000,936
DATED : January 4, 1977
INVENTOR(S) : Detlef C. Gloge

It is certified that error appears in the above-identified patent and that said Letters Patent are hereby corrected as shown below:

Column 5, line 53, "$\Lambda_c = 2\pi a_c/(2\Delta) = 2\pi/K_c$" should read --$\Lambda_c = 2\pi a_c/(2\Delta)^{1/2} = 2\pi/K_c$--.

Column 5, line 65, "(i.e., $r \quad a_c$)" should read --(i.e., $r \leq a_c$)--.

Column 6, line 7, "$R = 2\pi(H/D_f)$" should read --$R = 2\pi(H/D_f)^{1/4}$--.

Column 11, line 58, "$\Lambda_c = 2\pi\, a_c/(2\Delta)$" should read --$\Lambda_c = 2\pi\, a_c/(2\Delta)^{1/2}$--.

Column 12, line 6, "$n = n_1[1-\Delta(r/a_c)]$" should read --$n = n_1[1-\Delta(r/a_c)^\alpha]$--.

Column 12, line 14, "$\Lambda_c = 2\pi\, a_c/(2\Delta)$" should read --$\Lambda_c = 2\pi\, a_c/(2\Delta)^{1/2}$--.

Signed and Sealed this

*Twenty-fifth* Day of *September 1979*

[SEAL]

*Attest:*

*Attesting Officer*

LUTRELLE F. PARKER
*Acting Commissioner of Patents and Trademarks*